United States Patent [19]

Ohashi et al.

[11] Patent Number: 5,462,788
[45] Date of Patent: Oct. 31, 1995

[54] THERMOPLASTIC RESIN FILM HAVING EXCELLENT PRINTABILITY

[75] Inventors: Takashi Ohashi; Motoshi Hembo; Takatoshi Nishizawa; Isao Sunaga, all of Ibaraki, Japan

[73] Assignee: Oji Yuka Goseishi Co., Ltd., Tokyo, Japan

[21] Appl. No.: 330,012

[22] Filed: Oct. 27, 1994

[30] Foreign Application Priority Data

Feb. 3, 1994 [JP] Japan ................... 6-011642

[51] Int. Cl.$^6$ ........................................ B32B 3/00
[52] U.S. Cl. ................ 428/201; 428/206; 428/207; 428/451; 428/523
[58] Field of Search .................... 428/523, 201, 428/206, 207

[56] References Cited

U.S. PATENT DOCUMENTS 5,115,254  5/1992  Onishi et al. ................. 428/206
5,204,188  4/1993  Nitta et al. .
5,215,814  6/1993  Gager et al. .................. 428/246
5,306,690  4/1994  Ohno et al. ................... 428/216

FOREIGN PATENT DOCUMENTS 4-120139  4/1992  Japan .

*Primary Examiner*—Bernard Lipman
*Attorney, Agent, or Firm*—Dilworth & Barrese

[57] ABSTRACT

A thermoplastic resin film having excellent printability comprising (a) a support layer comprising a thermoplastic resin film and (b) a pigment coating layer provided on the front surface of said support layer or both the front surface and back surface of said support layer, wherein said thermoplastic resin film contains 1 to 30% by weight of petroleum resin.

13 Claims, 1 Drawing Sheet

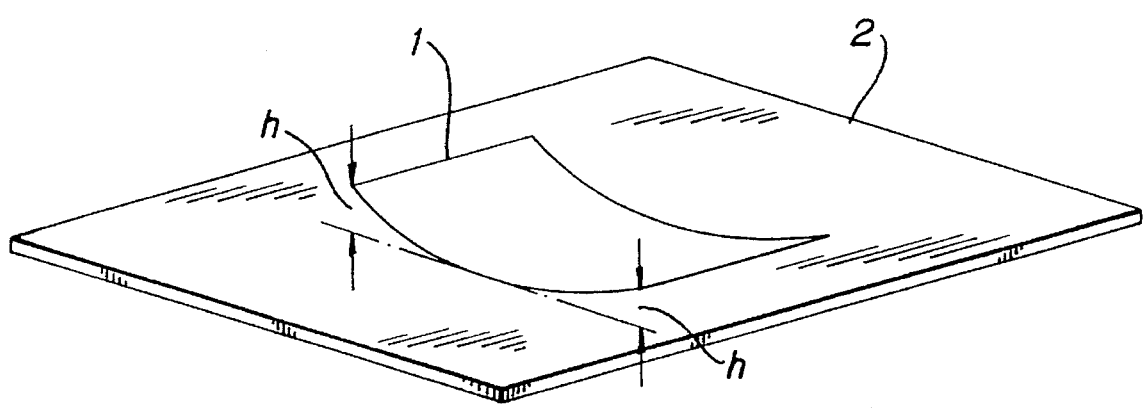

THERMOPLASTIC RESIN FILM HAVING EXCELLENT PRINTABILITY

FIELD OF THE INVENTION

The present invention relates to a uniaxially or biaxially stretched thermoplastic resin film having excellent printability which, when offset printed, is prevented from developing unevenness or curling due to the vehicle of an offset ink.

BACKGROUND OF THE INVENTION

Lithography, generally called offset printing, easily achieves multicolor printing and is used for printing on paper, polyethylene terephthalate films, polyamide films, coated paper, etc.

In particular, general-purpose drying type offset inks have the composition shown in Tables 1 and 2 below.

TABLE 1

Basic Composition of Offset Ink

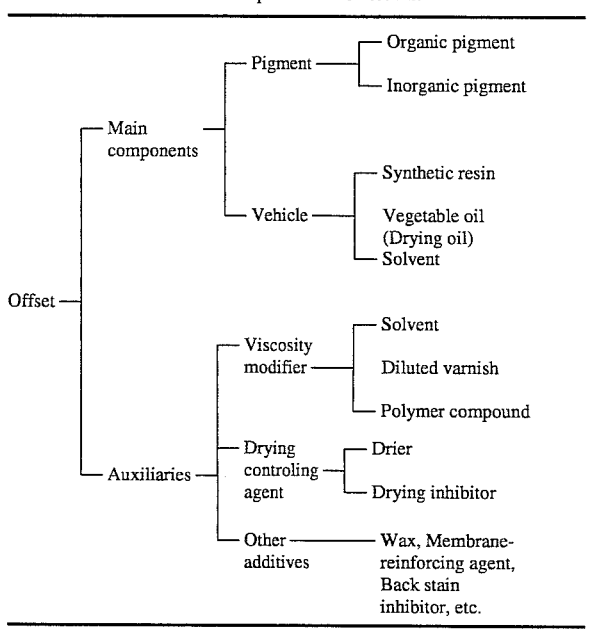

TABLE 2

| Composition of Offset Inks (parts by weight) | | | |
|---|---|---|---|
| | For Sheet Fed Press | For Non-Paper | For Web Offset Press |
| Pigment | 25 | 25 | 25 |
| Resin | 25 | 30 | 25 |
| Drying oil | 20 | 34 | 10 |
| High-boiling petroleum series solvent | 25 | 5 | 36 |
| Drier | 1 | 2 | — |
| Others | 4 | 4 | 4 |
| Total | 100 | 100 | 100 |

The vehicle in Table 1 constitutes the liquid portion of printing ink, serving to disperse the pigment to fluidize the ink so that the ink may be transferred smoothly on a printing machine from an ink fountain to printing paper via rollers, a printing plate, and a blanket. The vehicle turns solid after printing, serving to fix the pigment on the printed surface. The vehicles are divided into a linseed oil type, an alkyl type, a quick-drying resin type, and a heat-set type.

It has recently been desired to reduce the drying time of offset ink to improve printing speed. To this effect, a quick-drying ink containing, as the vehicle, a drying oil compounded with a resin and a mineral oil (high-boiling petroleum series solvent) has been used.

However, when a polyolefin film or synthetic paper comprising a stretched polyolefin film containing an inorganic fine powder (cf. JP-B-46-40794 (the term "JP-B" as used herein means an "examined published Japanese patent application"), JP-A-61-279543 (the term "JP-A" as used herein means an "unexamined published Japanese patent application"), and JP-A-61-3748) is printed using the above-described quick-drying offset ink, the polyolefin becomes swollen with the vehicle contained in the quick-drying offset ink (particularly a high-boiling petroleum series solvent, such as mineral oil), and the printed film or synthetic paper suffers from so-called solvent attack, i.e., partial development of unevenness of the surface or curling of the whole film in case of solid printing. Hence, practical application of such quick-drying offset inks has involved difficulties.

Therefore, in actual offset printing on polyolefin films, a special offset ink designed for polyolefin films which contains no mineral oil is employed at the expense of its quick drying properties.

However, since such a special offset ink for polyolefin films requires a long drying time, and printing businesses and ink manufacturers capable of dealing with the special offset inks are limited, it has been desired to develop polyolefin films or synthetic paper on which general-purpose offset inks of the oxidative polymerization type (drying oil type) can be applied.

Since it is common for general printers to carry out offset printing of pulp paper, such as fine paper and coated paper, using commercially available quick-drying inks, they must substitute the quick-drying ink with the special offset ink for non-absorbing materials each time polyolefin film or synthetic paper is to be printed.

Considering the increased time and labor involved in the ink substitution, general printers are unwilling to undertake printing of polyolefin-based films such as synthetic paper. This has been one of the reasons preventing a broader application of polyolefin films or synthetic paper in offset printing.

SUMMARY OF THE INVENTION

An object of the present invention is to provide a thermoplastic resin film excellent in printability which rarely develops unevenness on its surface or curling as a whole even when offset printed using a general-purpose oxidative polymerization type (drying oil type) offset ink.

As a result of various investigations for providing the foregoing object, it has been found herein that a thermoplastic resin film having excellent printability can be obtained by incorporating a suitable amount of a petroleum resin into the thermoplastic resin film, on one or both sides of which a pigment coating layer is to be provided. The objects of the present invention have been satisfied based on this finding.

That is, the thermoplastic resin film excellent in printability according to the present invention comprises (a) a support layer comprising a thermoplastic resin film and (b)

a pigment coating layer provided on the front surface of said support layer or both the front surface and back surface of said support layer, wherein said thermoplastic resin film contains 1 to 30% by weight of petroleum resin.

BRIEF DESCRIPTION OF THE DRAWING

FIGURE is a perspective view showing the method of measuring the height of curl of the printed film in the Examples.

DETAILED DESCRIPTION OF THE INVENTION

The invention will now be explained in detail.

I. Thermoplastic Resin Film Having Excellent Printability

The thermoplastic resin film having excellent printability according to the present invention comprises (a) a support layer comprising a thermoplastic resin film or a uniaxially or biaxially stretched film thereof having provided on the front surface of said support layer or both the front surface and back surface of said support layer (b) a pigment coating layer, wherein said thermoplastic resin film contains 1 to 30% by weight of petroleum resin.

The support layer comprising a thermoplastic resin film containing 1 to 30% by weight of a petroleum resin may be a laminate film containing another resin film (base layer). This being the case, the pigment coating layer is provided on the side of the thermoplastic resin film containing 1 to 30% by weight of a petroleum resin or a stretched film thereof (surface layer), with the petroleum resin-containing thermoplastic resin film preferably having a thickness of not less than 2 µm, more preferably 2 to 50 µm, further more preferably 5 to 50 µm.

II. Support Layer (1) Constituent Material (a) Thermoplastic Resin

Polyolefin resins are preferably used as the thermoplastic resin constituting the thermoplastic resin film.

Examples of the polyolefin resins include branched polyethylene, polypropylene, an ethylene-propylene random copolymer, an ethylene-propylene block copolymer, a propylene-butene-1 random copolymer, a propylene-poly(4-methylpentene-1) copolymer, and polystyrene.

(b) Petroleum Resin

The petroleum resin which can be incorporated into the above-described thermoplastic resin film is a hydrocarbon resin (a polymer or a hydrogenation product thereof) obtained by polymerizing a petroleum raw material resulting from thermal cracking of petroleum using a catalyst. The petroleum resin is generally composed of a mixture of resin-forming monomers, such as terpene, cyclopentadiene, styrene, methylstyrene, vinyltoluene, indene, methylindene, butadiene, isoprene, piperylene, and pentylene. The polymer may be a homopolymer of one of these monomers or a mixture of such homopolymers or a copolymer of some of these monomers.

In more detail, petroleum resins can be generally divided into the following groups according to *JET*, Vol. 37, No. 2, pp. 75–79 (1989):

(1) Aliphatic petroleum resins ($C_5$ petroleum resins)

(2) Aromatic petroleum resins ($C_9$ petroleum resins)

(3) Aliphatic/aromatic or aliphatic/alicyclic copolymer petroleum resins ($C_5/C_9$ petroleum resins)

(4) Cyclopentadiene series petroleum resins (DCPD petroleum resins)

(5) Hydrogenated petroleum resins derived from the resins (1) to (4) by hydrogenation.

Petroleum resins which can preferably be used in the present invention are hydrocarbon resins and include hydrocarbon polymers generally having a melting point of 60° to 150° C., preferably 70° to 130° C., derived from coke oven gas, coal tar fraction, decomposed and thermally cracked petroleum raw materials, essentially pure hydrocarbon raw materials, hydrocarbon raw materials derived from turpentine oil, or turpentine oil. Typical hydrocarbon resins include coumarone-indene resins, $C_5$ petroleum resins, styrene copolymers, cyclopentadiene resins, and terpene resins.

These resins are described in Kirk Osmar, *Encyclopedia of Chemical Technology*, Vol. 3, No. 11, pp. 242–255 (1966).

Coumarone-indene resins are hydrocarbon resins obtained by polymerization of resin-forming substances present in a coal tar distillate recovered from a coke oven, phenol-modified coumarone-indene resins, and derivatives thereof.

$C_5$ petroleum resins are obtained by polymerizing the $C_5$ cut of cracked petroleum or pentadiene recovered after extraction of an isoprene monomer from the $C_5$ cut as a main raw material usually using an aluminum halide catalyst.

Styrene copolymers include low-molecular-weight styrene homopolymer resins and copolymer resins of styrene and, e.g., α-methylstyrene, vinyltoluene, butadiene or indene, specifically alkylstyrene-indene copolymers.

Cyclopentadiene resins include homopolymer resins or copolymer resins of cyclopentadiene derived from a coal tar fraction or separated petroleum gas. The cyclopentadiene resins are prepared by maintaining the cyclopentadiene-containing raw material at a high temperature for a considerably long time resulting in the production of dimer, trimer, and/or high polymer depending on the temperature.

Terpene resins include polymers of terpenes, i.e., hydrocarbons represented by the empirical formula $C_{10}H_{16}$ present in most essential oils and oleoresins, and phenol-modified terpene resins, for example α-pinene, β-pinene, dipentene, limonene, myrcene, bornylene, camphene, and the like.

Preferred petroleum resins are hydrogenated petroleum resins (5) having a (ring and ball) softening point of 70° to 150° C.

Hydrogenated petroleum resins include "ARKON", produced by Arakawa Kagaku Kogyo K.K.; "CLEARON", produced by Yasuhara Chemical K.K.; "ESCOREZ", produced by Tonex Co., Ltd.; "FTR", produced by Mitsui Petrochemical Industries, Ltd.; and "MARUKAREZ", produced by Maruzen Sekiyu Kagaku K.K.

These petroleum resins are generally incorporated by melt-kneading with the thermoplastic resin.

The thermoplastic resin film containing the petroleum resin may contain 5 to 65% by weight of an inorganic fine powder.

(c) Inorganic Fine Powder

It is preferred that the above-described thermoplastic resin film contains an inorganic fine powder and that it be stretched to form a number of microvoids therein.

Examples of the inorganic fine powder includes calcium carbonate, calcined clay, diatomaceous earth, talc, titanium oxide, barium sulfate, aluminum sulfate, and silica. The inorganic fine powder preferably has an average particle size of not greater than 10 Bm, more preferably 0.05 to 4 µm.

(2) Formation of Support Layer

The support layer comprising the thermoplastic resin film containing 1 to 30% by weight of a petroleum resin or a stretched film thereof which can be used in the thermoplastic resin film with excellent printability of the present invention may be a single layer but is usually a laminate film obtained by separately melt-kneading a thermoplastic resin (base layer) and a mixture of 1 to 30% by weight of a petroleum resin and 70 to 99% by weight of a thermoplastic resin (front surface layer and back surface layer) in the respective extruder and laminate-extruded into a film, if desired, followed by stretching.

The thermoplastic resin film can be prepared by blown-film extrusion, T-die extrusion, stretching the film obtained by these molding methods uniaxially at a stretch ratio of 1.3 to 12 or biaxially at a stretch ratio of 1.3 to 12 in each direction, or laminating these films.

Taking coating properties in forming a pigment coating layer into consideration, an opaque stretched film having microvoids in the inside thereof and fine cracks on the surface thereof, so-called synthetic paper, is suitable as a surface on which a pigment coating layer can be intimately adhered.

Such synthetic paper includes a microvoid-containing film having a three layer structure A/B/A (uniaxially stretched film/biaxially stretched film/uniaxially stretched film) which is obtained as follows. A thermoplastic resin composition containing 5 to 60% by weight, preferably 10 to 45% by weight, of an inorganic fine powder and 40 to 95% by weight, preferably 55 to 90% by weight, of a thermoplastic resin is melt-kneaded in an extruder, extruded into a film through a die, and uniaxially stretched at a stretch ratio usually from 3 to 10, preferably 4 to 7 by utilizing the circumferential speed difference of the roll group, to obtain a base layer (B). A mixture comprising 1 to 30% by weight, preferably 3 to 25% by weight, of a petroleum resin, 5 to 65% by weight, preferably 10 to 50% by weight, of an inorganic fine powder, and 30 to 60% by weight, preferably 47 to 60% by weight, of a thermoplastic resin is fed to two separate extruders, melt-kneaded in each extruder, extruded into a film through two separate dies and laminated on both sides of the above-described base layer (B) comprising a uniaxially stretched film to form a front surface layer and a back surface layer ($A_1$, $A_2$). The resulting laminate film (front surface layer ($A_1$)/base layer (B)/back surface layer ($A_2$)) is stretched in the direction perpendicular to the stretching direction of the above-described thermoplastic resin uniaxially stretched film at a stretch ratio of 3 to 15, preferably 4 to 12 by means of a tenter, to obtain a microvoid-containing film having a three layer structure A/B/A (uniaxially stretched film/biaxially stretched film/ uniaxially stretched film).

If the amount of the petroleum resin in the surface layer is less than 1% by weight, no effect of preventing curling is produced. If it exceeds 30% by weight, blocking of the film (a phenomenon whereby the film sticks to various cooling rolls or heating rolls during film production) occurs, resulting in poor appearance due to surface roughening.

Since offset printed paper is usually stored in stacks, it is necessary to provide a petroleum resin-containing layer on not only the side to be printed but the back side of the base layer in order to prevent penetration of the solvent of the printing ink of the underlying printed film during storage.

A petroleum resin may also be incorporated into the base layer while reducing the petroleum resin content in the surface layer so that the occurrence of blocking of the film to rolls during the preparation of synthetic paper may be reduced and the synthetic paper may not suffer from a solvent attack even after 2 to 5 years from the production.

In this case, the synthetic paper which can be used as a support layer corresponds to a microvoid-containing thermoplastic resin laminate film comprising a biaxially stretched film base layer of a thermoplastic resin containing 5 to 35% by weight of an inorganic fine powder and 3 to 30% by weight of a petroleum resin having provided on both sides thereof a uniaxially stretched film of a mixture containing 3 to 25% by weight of a petroleum resin, 10 to 50% by weight of an inorganic fine powder, and 47 to 60% by weight of a thermoplastic resin, provided that the petroleum resin content in the biaxially stretched film base layer is higher than that in the uniaxially stretched film.

In the support layer, the front surface layer or the back surface layer each comprising the petroleum resin-containing resin film preferably has a thickness of not less than 2 µm, more preferably 2 to 50 µm, particularly preferably 5 µm to 50 µm. If the surface layer is thinner than 2 µm, the resulting thermoplastic resin film, when offset printed, tends to develop unevenness on its surface or curling as a whole, thereby enjoying little of the advantages of the present invention.

The thickness of the base layer is optional but preferably ranges from 8 to 300 µm, more preferably 20 to 150 µm, particularly preferably 30 to 120 µm.

III. Pigment Coating Layer

The pigment coating layer according to the present invention is provided on at least the printing side of the support layer in order to further improve suitability to offset printing.

Application of a pigment can be carried out in accordance with general coating techniques employed in the preparation of coated paper.

(1) Pigment Coating Composition

The pigment coating composition to be used for pigment coating includes latices containing 30 to 80% by weight of a pigment employed for general coated paper, such as clay, talc, calcium carbonate, magnesium carbonate, aluminum hydroxide, silica, aluminum silicate, calcium silicate, a plastic pigment, or silica, and 15 to 70% by weight of an adhesive.

The adhesive used here includes latices of SBR (styrene-butadiene rubber) or MBR (methacryl-butadiene rubber), acrylic emulsions, starch, PVA (polyvinyl alcohol), CMC (carboxymethyl cellulose), and methyl cellulose.

The pigment coating composition may further contain 0.1 to 5% by weight of a dispersant, such as sodium polycarboxylate, and 3 to 10% by weight of a crosslinking agent, such as polyamide-urea resin.

The pigment coating composition is preferably used as an aqueous coating composition having a solids content of 15 to 70% by weight, more preferably 35 to 65% by weight.

(2) Coating Method and Means

The coating composition can be applied to the support layer by such coating methods as gravure coating, wire bar coating, roll coating, blade coating, size press coating, and hot melt coating. The pigment coating layer is formed on one or both sides of the support layer.

(3) Spread

The pigment coating composition is applied at a spread preferably of 0.1 to 20 g/m², more preferably 1 to 15 g/m².

Accordingly, the pigment coating layer has a thickness preferably of 0.05 to 20 µm, more preferably 0.5 to 15 µm, particularly preferably 5 to 15 µm.

IV. Offset Printing

The resulting thermoplastic resin film with excellent printability of the present invention is offset printed by adhering an offset ink on the surface of the pigment coating layer thereof by means of an offset printing press.

(1) Offset Ink

The offset ink, in general, basically comprises main components comprising a pigment and a vehicle and auxiliaries comprising a viscosity modifier, a drying controlling agent, and other additives as shown in Tables 1 and 2 above.

(a) Pigment

The pigments include azo pigments, such as lithol red and benzidine yellow; lake pigments, such as permanent green, permanent rhodamine, permanent blue, and Lake Red C; organic pigments, such as Brilliant Carmine 6B and Phthalocyanine Blue; and inorganic pigments, such as alumina, barium sulfate, red iron oxide, chrome yellow, Prussian blue, titanium white, and carbon black.

(b) Vehicle

Vehicles include synthetic resins, vegetable oils (drying oils), and solvents.

Specific examples of these vehicles are:

1) linseed oil type vehicles, such as linseed oil and stand oil, and alkyd type vehicles, such as drying oil-modified alkyd resins, 2) quick-drying resin type vehicles mainly comprising a resin varnish, which is prepared by dissolving a rosin-modified phenolic resin in a mixture of linseed oil and tung oil or a low-viscosity linseed oil varnish and controlling the viscosity by addition of a petroleum fraction having a narrow boiling point range, and 3) heat-set type vehicles, such as varnish prepared by dissolving a resin in a petroleum fraction having a narrow boiling point range.

(c) Viscosity Modifier

The viscosity modifier includes solvents, diluted varnishes, and polymer compounds.

(d) Drying Controlling Agent

The drying controlling agent includes driers and drying inhibitors.

(e) Other Additives

Other additives include waxes, membrane-reinforcing agents, and back stain inhibitors.

(2) Offset Printing Method

Offset printing of the thermoplastic resin film with excellent printability of the present invention with the above-mentioned offset ink can be carried out in the same manner as general offset printing by the use of commercially available offset printing machines.

When an offset ink is adhered to the surface of the thermoplastic resin film with excellent printability of the present invention by offset printing, the printed polyolefin film or synthetic paper rarely develops unevenness on its surface or curling as a whole.

The present invention will now be illustrated in greater detail with reference to the accompanying Examples and Comparative Examples, but it should be understood that the present invention is not to be construed as being limited thereto. All the parts and percents are by weight unless otherwise indicated.

Evaluation in Examples and Comparative Examples was made according to the following methods. Methods of Evaluation (1) Height of Curl A film to be evaluated was printed solid on an offset printing press using a commercially available drying type offset ink NEW BEST ONE PROCESS BLACK M, manufactured by Toka Shikiso K.K., at an ink transfer amount of 1 g/m².

The printed film was cut to a size of 12 cm×5 cm, and the cut piece was placed on a flat plate for 24 hours. The presence of the curl was measured as shown in the figure, wherein a cut piece of printed film (1) was placed on a flat plate (2) and h was the height of curl.

(2) Development of Unevenness

A film to be evaluated was printed on an offset printing press using a commercially available drying type offset ink NEW BEST ONE PROCESS BLACK M, produced by Toka Shikiso K.K., to give a checkered pattern (1 cm×1 cm) at an ink transfer amount of 1 g/m².

The film unevenness formed by the printed part and the non-printed part was judged visually.

The judgement was made according to the following standard of evaluation.

No unevenness . . . A

Marked unevenness . . . B

EXAMPLE 1

Preparation of Support Layer (1) A composition of 85% of polypropylene (expressed as PP in the Table) having a melt flow rate (MFR) of 0.8 g/10 min and 15% of ground calcium carbonate having an average particle size of 1.5 μm (expressed as $CaCO_3$ in the Table) was melt-kneaded in an extruder set at 270° C., extruded into sheeting through a die, and cooled by a cooling apparatus to prepare an unstretched sheet.

The unstretched sheet was heated to 150° C. and stretched in the machine direction at a stretch ratio of 5 by utilizing the circumferential speed difference of the roll group to obtain a uniaxially 5-fold stretched sheet for base layer (B).

(2) A composition of 40% of polypropylene (represented as PP in the Table) having an MFR of 4.0 g/10 min, 45% of ground calcium carbonate having an average particle size of 1.5 μm (represented as $CaCO_3$ in the Table), and 15% of a petroleum resin (trade name "ARKON P-90", produced by Arakawa Kagaku K.K.; softening point: 90° C.) was fed to two separate extruders, melt-kneaded in each extruder set at 220° C. and extruded through two separate dies into sheeting to obtain front surface layer and back surface layer (A, A) before uniaxial stretching. These layers were laminated on both sides of the uniaxially stretched film base layer (B) described in (1) (A/B/A).

The resulting laminate sheet was cooled to 60° C., heated to 162° C., stretched in the transverse direction at a stretch ratio of 7.5 by means of a tenter, subjected to annealing at 167° C., and cooled to 60° C. The edges were trimmed to obtain a 3-layered thermoplastic resin stretched film (A/B/A thickness: 15 μm/65 μm/15 μm).

| Formation of Pigment Coating Layer | | |
| --- | --- | --- |
| (C) | Precipitated calcium carbonate (BRILLIANT-15, produced by Shiraishi Kogyo K.K.) | 40% |
| (D) | Kaolin clay (ULTRAWHITE-90, produced by Engelhard Corporation) | 10% |
| (E) | Alkyl acrylate-styrene copolymer resin emulsion (MOWINYL 877, produced by Hoechst Gosei K.K.) | 45% |
| (F) | Modified polyvinyl alcohol (GOHSEFIMER Z-100, produced by Nippon Gosei K.K.) | 5% |

An aqueous coating composition comprising the above components (the proportions are given on a solid basis) was prepared and applied to one side of the three-layered stretched film above obtained to a solid spread of 10 g/m² and dried at 105° C. for 1 minute to obtain a coated film.

In this case, 0.5 part of a sodium polycarboxylate (POISE 520, produced by Kao Corp.) was added as a dispersant per 100 parts of inorganic fine powders (C) and (D), and 10 parts of a polyamide-urea resin (SUMIREZ RESIN 633, produced by Sumitomo Chemical Co., Ltd.) was added as a crosslinking agent per 100 parts of PVA (F).
Evaluation The resulting coated thermoplastic resin film was printed solid on an offset printing press using a commercially available drying type offset ink NEW BEST PROCESS BLACK M (produced by Toka Shikiso K.K.) at an ink transfer amount of 1 g/m$^2$.

The height of curl and development of unevenness of the resulting printed film were evaluated according to the above-described methods of evaluation. The results obtained are shown in Table 3.

EXAMPLE 2

The same procedure as in Example 1 was repeated, except for replacing ARKON P-90 (softening point: 90° C.) with a petroleum resin ARKON P-125 (softening point: 125° C.), produced by Arakawa Kagaku K.K. The results obtained are shown in Table 3.

EXAMPLE 3

The same procedure as in Example 1 was repeated, except for replacing ARKON P-90 (softening point: 90° C.) with a petroleum resin ARKON P-140 (softening point: 140° C.), produced by Arakawa Kagaku K.K. The results obtained are shown in Table 3.

EXAMPLE 4

The same procedure as in Example 1 was repeated, except for replacing ARKON P-90 (softening point: 90° C.) with a petroleum resin CLEARON P-125 (softening point: 125° C.), produced by Yasuhara Chemical K.K. The results obtained are shown in Table 3.

EXAMPLE 5

The same procedure as in Example 1 was repeated, except for replacing ARKON P-90 (softening point: 90° C.) with a petroleum resin ESCOREZ E5320 (softening point: 125° C.) produced by Tonex Co., Ltd. The results obtained are shown in Table 3.

EXAMPLE 6

The same procedure as in Example 3 was repeated, except for changing the amounts of the polypropylene and the petroleum resin ARKON P-140 (softening point: 140° C.) in the surface layer to 50% and 5%, respectively. The results obtained are shown in Table 3.

EXAMPLE 7

The same procedure as in Example 3 was repeated, except for changing the amounts of the polypropylene and the petroleum resin ARKON P-140 (softening point: 140° C.) in the front surface layer or the back surface layer to 45% and 10%, respectively. The results obtained are shown in Table 3.

EXAMPLE 8

The same procedure as in Example 7 was repeated, except for changing the spread of the pigment coating layer to 5 g/m$^2$. The results obtained are shown in Table 3.

EXAMPLE 9

The same procedure as in Example 7 was repeated, except for changing the thickness of the front surface layer or the back surface layer (A)/base layer (B) of the support layer to 10 μm/75 μm. The results obtained are shown in Table 3.

EXAMPLE 10

The same procedure as in Example 6, except for changing the amounts of the polypropylene and the inorganic fine powder in the front surface layer or the back surface layer to 65% and 25%, respectively. The results obtained are shown in Table 3.

COMPARATIVE EXAMPLE 1

The same procedure as in Example 1 was repeated, except for changing the amounts of the polypropylene and the inorganic fine powder in the front surface layer or the back surface layer to 55% and 45%, respectively, and omitting the petroleum resin. The results obtained are shown in Table 3.

COMPARATIVE EXAMPLE 2

The same procedure as in Example 3 was repeated, except for changing the amounts of the polypropylene and the petroleum resin ARKON P-140 (softening point: 140° C.) in the front surface layer or the back surface layer to 54% and 1%, respectively. The results obtained are shown in Table 3.

COMPARATIVE EXAMPLE 3

The same procedure as in Example 3 was repeated, except for changing the thickness of the front surface layer or the back surface layer and the base layer to 0.5 μm and 94 μm, respectively. The results obtained are shown in Table 3.

EXAMPLE 11

The same procedure as in Example 1 was repeated, except for replacing the three-layered stretched film with a film prepared as follows.
Preparation of Support Layer (1) A composition of 65% of polypropylene (expressed as PP in the Table) having a melt flow ratio (MFR) of 0.8 g/10 min, 20% of a petroleum resin ARKON P-140 (softening point: 140° C.), and 15% of ground calcium carbonate (expressed as CaCO$_3$ in the Table) having an average particle size of 1.5 μm was melt-kneaded in an extruder set at 270° C., extruded into sheeting through a die, and cooled by a cooling apparatus to prepare an unstretched sheet.

Then, the unstretched sheet was heated to 150° C. and stretched in the machine direction at a stretch ratio of 5 by utilizing the circumferential speed difference of the roll group to obtain a uniaxially 5-fold stretched sheet for base layer (B).

(2) A composition of 52% of polypropylene (represented as PP in. the Table) having an MFR of 4.0 g/10 min, 45% of ground calcium carbonate (represented as CaCO$_3$ in the Table) having an average particle size of 1.5 μm, and 3% of a petroleum resin ARKON P-90 (softening point: 90° C.) was fed to two separate extruders, melt-kneaded in each extruder set at 220° C. and extruded through two separate dies into sheeting to obtain front surface layer and back surface layer (A, A) before uniaxial stretching. These layers were laminated on both sides of the uniaxially stretched base layer (B)

described in (1) (A/B/A).

The resulting laminate sheet was cooled to 60° C., heated to 162° C., stretched in the transverse direction at a stretch ratio of 7.5 by means of a tenter, subjected to annealing at 167° C., and cooled to 60° C. The edges were trimmed to obtain a 3-layered thermoplastic resin stretched film (A/B/A thickness: 15 μm/65 μm/15 μm).

EXAMPLE 12

Pigment-coated synthetic paper was obtained in the same manner as in Example 6, except that the aqueous pigment coating composition was coated on both sides of the three-layered thermoplastic resin stretched film to form a pigment coating layer having a thickness of 10 μm on each side. The resulting coated synthetic paper was evaluated in the same manner as in Example 1.

film of a thermoplastic resin containing 1 to 30% by weight of a petroleum resin and 5 to 65% by weight of inorganic fine powder.

4. A thermoplastic resin film having excellent printability as claimed in claim 1, wherein said thermoplastic resin film support layer is a microvoid-containing laminate film comprising a base layer comprising a biaxially stretched film of a thermoplastic resin containing 5 to 60% by weight of an inorganic fine powder having provided on both sides thereof a uniaxially stretched film of a mixture containing 1 to 30% by weight of a petroleum resin, 5 to 65% by weight of an inorganic fine powder, and 30 to 60% by weight of a thermoplastic resin.

5. A thermoplastic resin film having excellent printability as claimed in claim 4, wherein said thermoplastic resin is a polyolefin resin.

6. A thermoplastic resin film having excellent printability

TABLE 3

| | Front Surface and Back Surface Layers (A) (uniaxial) | | | | Base Layer (B) (biaxial) | | | Pigment Coating | Printability | |
|---|---|---|---|---|---|---|---|---|---|---|
| | Thermoplastic Resin (%) | Petroleum Resin* (%) | | Inorganic Fine Powder (%) | Thickness (μm) | Thermoplastic Resin (%) | Inorganic Fine Powder (%) | Thickness (μm) | Layer (C) (g/m²) | Curl Height (mm) | Unevenness |
| Example 1 | PP 40 | ARKON P-90 | 15 | CaCO₃ 45 | 15 | PP 85 | CaCO₃ 15 | 65 | 10 | 0 | A |
| Example 2 | PP 40 | ARKON P-125 | 15 | CaCO₃ 45 | 15 | PP 85 | CaCO₃ 15 | 65 | 10 | 0 | A |
| Example 3 | PP 40 | ARKON P-140 | 15 | CaCO₃ 45 | 15 | PP 85 | CaCO₃ 15 | 65 | 10 | 0 | A |
| Example 4 | PP 40 | CREARON P-125 | 15 | CaCO₃ 45 | 15 | PP 85 | CaCO₃ 15 | 65 | 10 | 0 | A |
| Example 5 | PP 40 | ESCOREZ E5320 | 15 | CaCO₃ 45 | 15 | PP 85 | CaCO₃ 15 | 65 | 10 | 0 | A |
| Example 6 | PP 50 | ARKON P-140 | 5 | CaCO₃ 45 | 15 | PP 85 | CaCO₃ 15 | 65 | 10 | 7 | A |
| Example 7 | PP 45 | ARKON P-140 | 10 | CaCO₃ 45 | 15 | PP 85 | CaCO₃ 15 | 65 | 10 | 1 | A |
| Example 8 | PP 45 | ARKON P-140 | 10 | CaCO₃ 45 | 15 | PP 85 | CaCO₃ 15 | 65 | 5 | 3 | A |
| Example 9 | PP 45 | ARKON P-140 | 10 | CaCO₃ 45 | 10 | PP 85 | CaCO₃ 15 | 75 | 10 | 5 | A |
| Example 10 | PP 65 | ARKON P-140 | 10 | CaCO₃ 25 | 15 | PP 85 | CaCO₃ 15 | 65 | 10 | 5 | A |
| Compara. Example 1 | PP 55 | — | | CaCO₃ 45 | 15 | PP 85 | CaCO₃ 15 | 65 | 10 | 30 | B |
| Compara. Example 2 | PP 54 | ARKON P-140 | 1 | CaCO₃ 45 | 15 | PP 85 | CaCO₃ 15 | 65 | 10 | 25 | B |
| Compara. Example 3 | PP 40 | ARKON P-140 | 15 | CaCO₃ 45 | 0.5 | PP 85 | CaCO₃ 15 | 94 | 10 | 20 | B |
| Example 11** | PP 52 | ARKON P-140 | 3 | CaCO₃ 45 | 15 | PP 65 | CaCO₃ 15 | 65 | 8 | 4 | A |
| Example 12** | PP 50 | ARKON P-140 | 5 | CaCO₃ 45 | 15 | PP 85 | CaCO₃ 15 | 65 | 10 | 2 | A |

Note:
*: ARKON P-90, P-125, P-140: products of Arakawa Kagaku K.K.; CREARON P-125: product of Yasuhara Chemical K.K.; ESCOREZ E5320: product of Tonex Co., Ltd.
**: The base layer further contained 20% of a petroleum resin ARKON P-140.
***: The pigment coating layer was provided on both sides.

While the invention has been described in detail and with reference to specific embodiments thereof, it will be apparent to one skilled in the art that various changes and modifications can be made therein without departing from the spirit and scope thereof.

What is claimed is:

1. A thermoplastic resin film having excellent printability comprising (a) a support layer comprising a thermoplastic resin film and (b) a pigment coating layer provided on the front surface of said support layer or both the front surface and back surface of said support layer, wherein said thermoplastic resin film contains 1 to 30% by weight of petroleum resin.

2. A thermoplastic resin film having excellent printability as claimed in claim 1, wherein said thermoplastic resin is a polyolefin resin.

3. A thermoplastic resin film having excellent printability as claimed in claim 1, wherein said thermoplastic resin film support layer is a microvoid-containing opaque stretched as claimed in claim 1, wherein said petroleum resin is a hydrogenated petroleum resin having a softening point of 70° to 150° C.

7. A thermoplastic resin film having excellent printability as claimed in claim 1, wherein said pigment coating layer has a thickness of 0.05 to 20 μm.

8. A thermoplastic resin film having excellent printability as claimed in claim 1, wherein said pigment coating layer contains 30 to 80% by weight of a pigment and 15 to 70% by weight of an adhesive.

9. A thermoplastic resin film having excellent printability as claimed in claim 4, wherein said biaxially stretched film and said uniaxially stretched film of said thermoplastic resin film support layer have a thickness of 8 to 300 μm and a thickness of 2 to 50 μm, respectively.

10. A thermoplastic resin film having excellent printability as claimed in claim 1, wherein said pigment coating layer is provided on both sides of said support layer.

11. A thermoplastic resin film having excellent printability comprising (a) a support layer comprising a thermoplastic resin film and (b) a pigment coating layer provided on the front surface of said support layer or both the front surface and back surface of said support layer, wherein said thermoplastic resin film support layer is a microvoid-containing laminate film comprising a biaxially stretched film base of a thermoplastic resin containing 5 to 35% by weight of an inorganic fine powder and 3 to 30% by weight of a petroleum resin, having provided on both sides thereof a uniaxially stretched film of a mixture containing 3 to 25% by weight of a petroleum resin, 10 to 50% by weight of an inorganic fine powder, and 47 to 60% by weight of a thermoplastic resin, provided that the petroleum resin content in said biaxially stretched film base layer is higher than that in said uniaxially stretched film.

12. A thermoplastic resin film having excellent printability as claimed in claim 11, wherein said thermoplastic resin is a polyolefin resin.

13. A thermoplastic resin film having excellent printability as claimed in claim 11, wherein said biaxially stretched film and said uniaxially stretched film of said thermoplastic resin film support layer have a thickness of 8 to 300 μm and a thickness of 2 to 50 μm, respectively.

* * * * *